(No Model.)  2 Sheets—Sheet 1.

C. E. W. WOODWARD.
WHEEL TIRE.

No. 466,548.   Patented Jan. 5, 1892.

Witnesses:
J. N. Shumway
L. D. Kelsey

Charles E. W. Woodward
Inventor
By Attys.
Earle Seymour (No Model.) 2 Sheets—Sheet 2.
C. E. W. WOODWARD.
WHEEL TIRE.
No. 466,548. Patented Jan. 5, 1892.
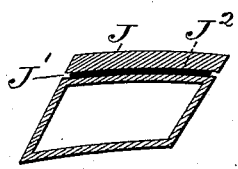
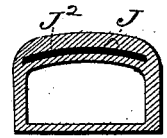
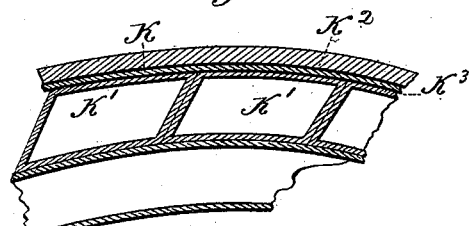
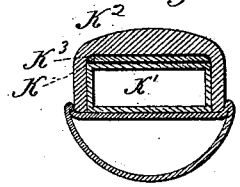
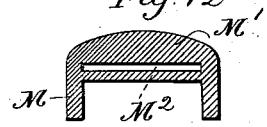
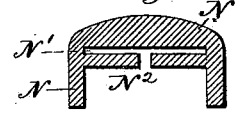
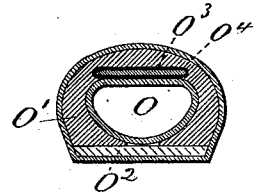
Witnesses
J. H. Shumway
L. D. Kelsey
Charles E. W. Woodward
Inventor
By Attys.
Earle Seymour
THE NORRIS PETERS CO., PHOTO-LITHO., WASHINGTON, D. C.

UNITED STATES PATENT OFFICE.

CHARLES E. W. WOODWARD, OF CHICOPEE FALLS, MASSACHUSETTS, ASSIGNOR TO THE OVERMAN WHEEL COMPANY, OF SAME PLACE.

WHEEL-TIRE.

SPECIFICATION forming part of Letters Patent No. 466,548, dated January 5, 1892.

Application filed November 24, 1890. Serial No. 372,443. (No model.)

*To all whom it may concern:*

Be it known that I, CHARLES E. W. WOODWARD, of Chicopee Falls, in the county of Hampden and State of Massachusetts, have invented a new Improvement in Wheel-Tires; and I do hereby declare the following, when taken in connection with accompanying drawings and the letters of reference marked thereon, to be a full, clear, and exact description of the same, and which said drawings constitute part of this specification, and represent, in—

Figure 1:
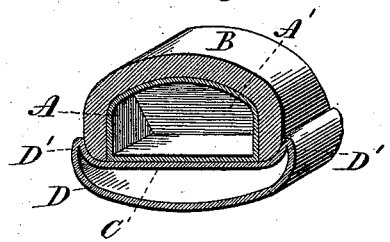
Figure 2:
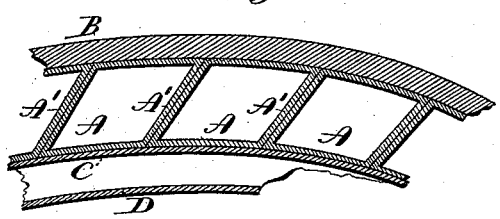
Figure 3:
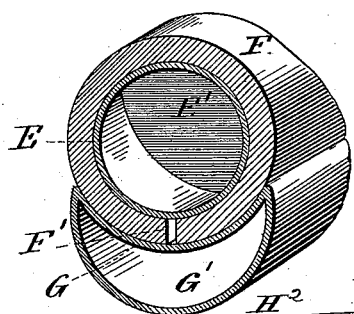
Figure 4:
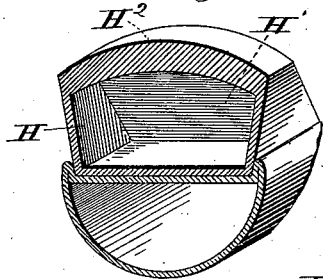
Figure 5:
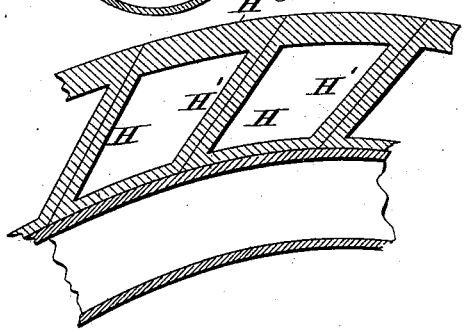
Figure 6:
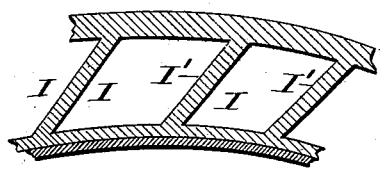

Figure 1, a view in transverse section showing one form which isolated segmental air-chambers constructed in accordance with my invention may assume, together with a flexible cover for inclosing them; Fig. 2, a view showing the same construction in longitudinal central section; Fig. 3, a view in transverse section showing a cylindrical segmental air-chamber and cover; Fig. 4, a similar view showing still another form of segmental air-chamber, which in this case has a thickened tread and requires no cover; Fig. 5, a view in central longitudinal section showing how segmental air-chambers like that shown in the preceding figure are arranged; Fig. 6, a similar view showing segmental air-chambers made integral with each other, but still having their end walls inclined so that the chambers virtually overlap each other at their ends; Fig. 7, a detached view, in longitudinal central section, of a segmental air-chamber having a thickened tread, which is provided with a longitudinal opening to receive a metallic reinforce consisting in this case of a short plate of metal slightly curved longitudinally to correspond to the curve of the segment; Fig. 8, a view in transverse section of the construction shown in the preceding figure; Fig. 9, a detached perspective view of the plate forming the reinforce shown in the last two preceding figures; Fig. 10, a view in vertical longitudinal section showing a continuous reinforce wrapped in cloth and interposed between the segmental air-chambers and a cover inclosing the same; Fig. 11, a view in transverse section of the construction shown in the preceding figure; Fig. 12, a detached view in transverse section showing a cover provided with a longitudinal interior opening for receiving a reinforce; Fig. 13, a modified form of the cover shown in the preceding figure; Fig. 14, a view in transverse section of another form of tire made in accordance with this invention.

My invention relates to an improvement in that class of pneumatic tires composed of isolated segmental air-chambers in which the compression of the inclosed air is localized and confined to the chambers in immediate contact with the ground, whereby the degree of compression required to sustain the load is secured by the use of a comparatively small volume of air, and consequently of a small tire, the objects of the invention being to produce a durable, stable, compact, and effective tire of this type.

With these objects in view my invention consists in a tire made up of a series of isolated segmental air-chambers having inclined end walls, which are thus adapted to overlap each other; in a metallic reinforce located outside of such segmental air-chambers and receiving support from them, and in certain details of construction and combinations of parts, as will be hereinafter described, and pointed out in the claims.

The segmental air-chamber A (shown by Fig. 1 of the drawings) has the form in transverse section of a low, broad, and stilted arch, its end walls A' being inclined and all of its walls being of uniform thickness. It is inclosed by a heavy cover B, of the same arch-shaped form and having its bases arranged to bear upon the tread C of the hollow rim D and to set down between the retaining-flanges D' D' thereof. In Fig. 2 of the drawings a number of such segmental air-chambers are combined together, showing how their ends are overlapped. By making the walls of the chambers inclined they yield to pressure much more readily than radial walls, which interfere with the cushioning action of the tire, whereas inclined walls exert no sensible resistance.

The segmental air-chamber E (shown by Fig. 3 of the drawings) is cylindrical in cross-section, but has inclined end walls, one of which is indicated by E'. The cover F shown in this construction is cylindrical in transverse section, but split longitudinally, as at F', to permit the independent segmental air-chambers E to be inserted into it, the split side of the tube being attached to the concaved tread G of the crescentic hollow rim G'.

The segmental air-chamber H (shown by Fig. 4 of the drawings) has inclined walls H', the tread H² of this form of segmental air-chamber being thickened, whereby an external cover is dispensed with, as shown by Fig. 5 of the drawings, although a cover may be used, if desired.

As shown by Fig. 6 of the drawings, the segmental air-chambers I are not made independent, as elsewhere represented, but are integral with each other and molded in the tire. They are, however, separated from each other by inclined walls I', so that they have the same effect, broadly, as the independent segmental air-chambers with correspondingly-inclined walls.

The segmental air-chamber shown by Fig. 7 of the drawings has its thickened tread J provided with a longitudinal opening J', which receives a reinforce J², made of a small piece of sheet metal bowed to correspond to the curve of the segment and made just a little shorter than the same, as well shown by the figure. This reinforce gives increased stability to the tire without sensibly detracting from its radial cushioning capacity, while it secures an equalizing action between the two side walls of the tire and prevents the same from being inwardly displaced on one side more than on the other, and thus is a safeguard against slipping sidewise.

Fig. 8 of the drawings shows how the edges of the reinforce extend over the side walls of the tire so as to join them and secure their support. The reinforce, it will be observed, is located outside of the air-space and is virtually supported by the entire segment. Instead of using an independent reinforce for each segment, segments so made may be strung, as it were, on one long reinforcing-strip, the ends of which may be united in any suitable manner. When thus constructed and combined, the reinforce will secure the segments to the rim. The reinforce K (shown by Fig. 10 of the drawings) is such a strip; but instead of passing through openings provided in the treads of the segments, as above suggested, it is located entirely outside of overlapping segments K' and interposed between their treads and a cover K². In this case the reinforce has a wrapper K³, of cloth, to prevent it from cutting the rubber of the segments or of the cover. If desired, however, the said wrapper may be dispensed with, as it is not an essential feature. Fig. 11 of the drawings represents this construction in cross-section.

Fig. 12 shows a cover M, having a thickened tread M', provided with an interior longitudinal opening M² to receive a continuous reinforce. The cover N (shown by Fig. 13 of the drawings) is provided with a corresponding opening N', and also with a longitudinal radial passage N², leading into the said opening N' through the center of the lower face of the tread N³ and provided for facilitating the location of the reinforce in the tire. It will readily be seen that under this construction it will not be necessary to split either the cover or the reinforce for locating the latter in place. If desired, the passage N² might be made transverse instead of longitudinal, but this would necessitate cutting the reinforce.

In the construction shown by Fig. 14 of the drawings the segmental air-chamber O is inclosed by a heavy cover O', which is brought around under it, so that its edges nearly meet, the same being supported on the flat solid rim O². The reinforce O³ is located between the flattened outer face of the air-chamber and the crown or middle portion of the cover, which is itself entirely inclosed by a protecting-envelope O⁴ of adhesive cloth or canvas. The end walls of the chamber O are designed to be inclined in the same manner as shown in the other figures.

It will be observed that in all of the constructions shown the end walls of the segmental air-chambers are inclined and that the metallic reinforce, whether it be segmental or continuous, is located on the outside of the air-spaces of the segments and receives support therefrom. The advantages of these two constructions having been referred to need not be pointed out again, nor need it be explained how much greater compression is secured by the same load when the inclosed body of air is small, as is obtained by the use of segmental air-chambers of small capacity in place of a continuous air-chamber such as has been chiefly employed before. I am aware, however, that segmental air-chambers as applied to cushioning-tires for vehicles are not broadly new, and I do not claim them as such.

Having fully described my invention, what I claim as new, and desire to secure by Letters Patent, is—

1. A wheel-tire made up of a series of isolated segmental air-chambers having inclined end walls which overlap each other, substantially as described.

2. A wheel-tire having a series of independent segmental air-chambers having inclined end walls which overlap each other, substantially as described.

3. A wheel-tire having a series of isolated segmental air-chambers having inclined end walls and thickened outer walls or treads, substantially as described.

4. A wheel-tire having a series of isolated segmental air-chambers having inclined end walls which overlap each other, and a heavy cover encircling the said chambers, substantially as described.

5. A wheel-tire having a series of isolated segmental air-chambers having inclined end walls which overlap each other, and a metallic reinforce located outside of the air-spaces of the said segmental chambers and receiving support from the outer and side walls thereof, substantially as described.

6. A wheel-tire having a series of isolated segmental air-chambers having thickened treads provided with longitudinal openings, in combination with a metallic reinforce located in the said openings, substantially as described.

7. A wheel-tire having a series of isolated segmental air-chambers with thickened treads provided with longitudinal openings, in combination with a continuous reinforce passing through the said openings, substantially as described.

In testimony whereof I have signed this specification in the presence of two subscribing witnesses.

CHARLES E. W. WOODWARD.

Witnesses:
W. P. HADLEY,
W. S. L. HAWKINS.